US006817249B2

(12) United States Patent
Yamazaki

(10) Patent No.: US 6,817,249 B2
(45) Date of Patent: Nov. 16, 2004

(54) MEASUREMENT PIPE FOR ELECTROMAGNETIC FLOWMETER

(75) Inventor: Yoshio Yamazaki, Tokyo (JP)

(73) Assignee: Yamatake Corporation, Tokyo (JP)

( * ) Notice: Subject to any disclaimer, the term of this patent is extended or adjusted under 35 U.S.C. 154(b) by 0 days.

(21) Appl. No.: 10/631,446

(22) Filed: Jul. 30, 2003

(65) Prior Publication Data

US 2004/0149046 A1 Aug. 5, 2004

(30) Foreign Application Priority Data

Jan. 30, 2003 (JP) ....................................... 2003-022275

(51) Int. Cl.[7] ................................................. G01F 1/58
(52) U.S. Cl. .................................................... 73/861.12
(58) Field of Search ......................... 73/861.12, 861.11, 73/861.13, 861.14, 861.15, 861.16

(56) References Cited

U.S. PATENT DOCUMENTS 4,297,896 A * 11/1981 May ........................ 73/861.12
4,565,619 A * 1/1986 Gardner et al. ............. 204/400
5,773,723 A * 6/1998 Lewis et al. ............. 73/861.12

FOREIGN PATENT DOCUMENTS

JP 61-271419 A 12/1986
JP 61-294316 A 12/1986
JP 02-028411 U 7/1990

* cited by examiner

*Primary Examiner*—Edward Lefkowitz
*Assistant Examiner*—Jewel V. Thompson
(74) *Attorney, Agent, or Firm*—Blakely Sokoloff Taylor & Zafman LLP

(57) ABSTRACT

A measurement pipe for an electromagnetic flowmeter includes a cylindrical pipe main body, a pair of flanges, and a lining material. The cylindrical pipe main body has openings at its two ends. The pair of flanges are integrally formed with the pipe main body to project outside the openings. The lining material is made of a reinforcing-material-mixed synthetic resin to cover at least an inner surface of the pipe main body and side surfaces of the flanges.

4 Claims, 3 Drawing Sheets

MEASUREMENT PIPE FOR ELECTROMAGNETIC FLOWMETER

BACKGROUND OF THE INVENTION

The present invention relates to a measurement pipe for an electromagnetic flowmeter used for measuring the flow rate of a conductive fluid.

In an electromagnetic flowmeter employing the Faraday law of electromagnetic induction as its measurement principle, excitation coils and a pair of electrodes are arranged in a measurement pipe such that the magnetic fields of the coils, the axes of the electrodes, and the axis of the measurement pipe are perpendicular to each other. In this arrangement, the flow rate or average flow velocity of the measurement target fluid is measured by extracting an electromotive force generated in the conductive measurement target fluid flowing in the measurement pipe by the electrodes.

In general, a measurement pipe is made of a nonmagnetic material such as stainless steel. To prevent the short circuit of the electromotive force generated in the conductive measurement target fluid, as shown in Japanese Utility Model Publication No. 2-28411 (reference 1), insulating coating with a lining material is performed for the inner surface of the measurement pipe which serves as a liquid contact surface with the measurement target fluid, and the outer surfaces of flanges integrally formed at the openings of the two ends of the measurement pipe, i.e., those surfaces of the flanges which are to be connected to pipes (to be referred to as pipe connection end faces hereinafter).

An electromagnetic flowmeter used for processes is often exposed to various types of fluid conditions, e.g., the temperature, pressure, whether a corrosive/slurry component is present, or the like. Accordingly, as the lining material, an expensive material having an excellent heat resistance, corrosion resistance, electrical insulation, and the like, e.g., fluoroplastic, is used. In an electromagnetic flowmeter whose application is limited for measuring water, an inexpensive material such as chloroprene rubber is used as the lining material.

The conventional lining materials as described above, however, do not adhere to the measurement pipe well, and can be separated from the measurement pipe easily. For this reason, as shown in FIG. 3, a reinforcing pipe 2 formed of a punching plate (porous plate) is attached in a measurement pipe 1 in advance through a ring 3, and is covered with a lining material 4. This increases the mechanical bonding strength of the lining material 4 and measurement pipe 1 to prevent separation of the lining material 4 and deformation or the like of the lining material 4 caused by temperature change or pressure change in the measurement pipe 1. A lining material reinforcing structure like this is described in the above reference 1, Japanese Patent Laid-Open Nos. 61-294316 (reference 2) and 61-271419 (reference 3).

As a structure for preventing separation of the lining material 4 from the flange portions, as shown in FIG. 3, part of the open surfaces of annular grooves 6 formed in pipe connection end faces 5*a* of flanges 5 are covered with ring plates 7. Hence, the ring plates 7 prevent separation and removal of the lining material 4 filled and solidified in the annular grooves 6. Reference numerals 8 denote electrodes; 9, compression coil springs for pressing the electrodes 8; 10, tube-like caps for accommodating the electrodes 8 and compression coil springs 9; 11, saddle-shaped excitation coils; 12, a signal lead wire; and 13, a conductive measurement target fluid.

As described above, as the conventional lining material does not adhere to the measurement pipe 1 well, the reinforcing pipe 2 must be fixed to the inner surface of the measurement pipe 1 through the ring 3, and the annular grooves 6 must be formed in the pipe connection end faces 5*a* of the flanges 5 and the ring plates 7 must be welded to the annular grooves 6. This increases the number of components, the number of manufacturing steps, and the number of assembling steps of the electromagnetic flowmeter, leading to a further increase in the manufacturing cost.

When the lining material is a fluoroplastic, with general injection molding (with a comparatively high speed and high pressure), when the resin is cooled to solidify and shrinks during crystallization, a large stress is left. Therefore, the cold flow characteristics (a creep deformation, among those occurring when a load is continuously applied for a long period of time, which occurs in room temperature or less) in normal temperature and under normal pressure are poor, cracking or fracture tends to occur easily, and the sealing performance for electrode attaching holes 14 decreases. As a countermeasure against these problems, collars 8A of the electrodes 8 are urged against annular lining portions 4*a* covering the peripheral portions of the outer openings of the electrode attaching holes 14 by the compression coil springs 9, respectively, thereby sealing the electrode attaching holes 14.

When the collars 8A are always urged with the spring pressures, however, the lining portions 4*a* cause compression deformation to decrease the electrode-to-electrode distance, and outputs extracted from the electrodes 8 decrease. In addition, as the caps 10 are formed cylindrically and accommodate the electrodes 8 and compression coil springs 9, they project from the outer surface of the measurement pipe 1 largely. Chloroprene rubber has a low heat resistance and tends to wear easily due to the excessive elasticity, so that its use is limited depending on the application. A manufactured product needs further manual processing.

From the above reasons, as a lining material, it is required to select one with a comparatively good heat resistance, weathering resistance, and corrosion resistance, which requires a low cost, has good moldability, and meets the requested specification.

SUMMARY OF THE INVENTION

It is an object of the present invention to provide a measurement pipe for an electromagnetic flowmeter, in which the cost of the lining material is reduced.

It is another object of the present invention to provide a measurement pipe for an electromagnetic flowmeter, in which components such as a reinforcing pipe, ring plate, compression coil spring, and the like become unnecessary to reduce the number of manufacturing steps, the number of components, the number of assembling steps, and the like, so that the total cost of the entire apparatus can be reduced.

In order to achieve the above objects, according to the present invention, there is provided a measurement pipe for an electromagnetic flowmeter, comprising a cylindrical pipe main body having openings at two ends thereof, a pair of flanges integrally formed with the pipe main body to project outside the openings, and a lining material made of a reinforcing-material-mixed synthetic resin to cover at least an inner surface of the pipe main body and side surfaces of the flanges.

DESCRIPTION OF THE PREFERRED EMBODIMENT

Figure 1:
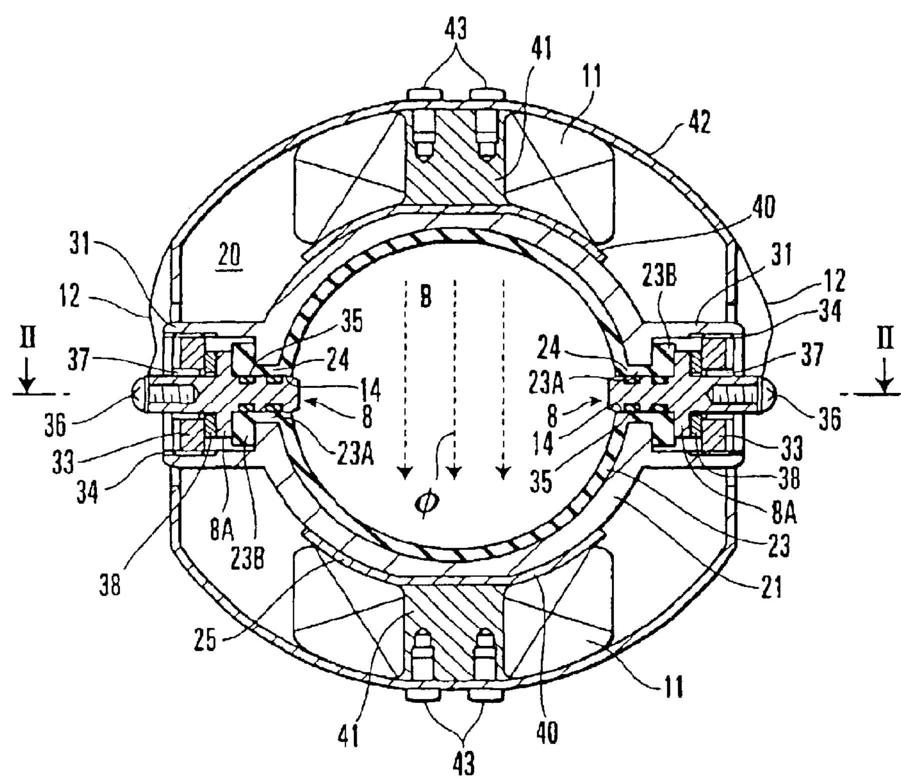
FIG. 1 is a sectional view of a measurement pipe for an electromagnetic flowmeter according to one embodiment of the present invention.
Figure 2:
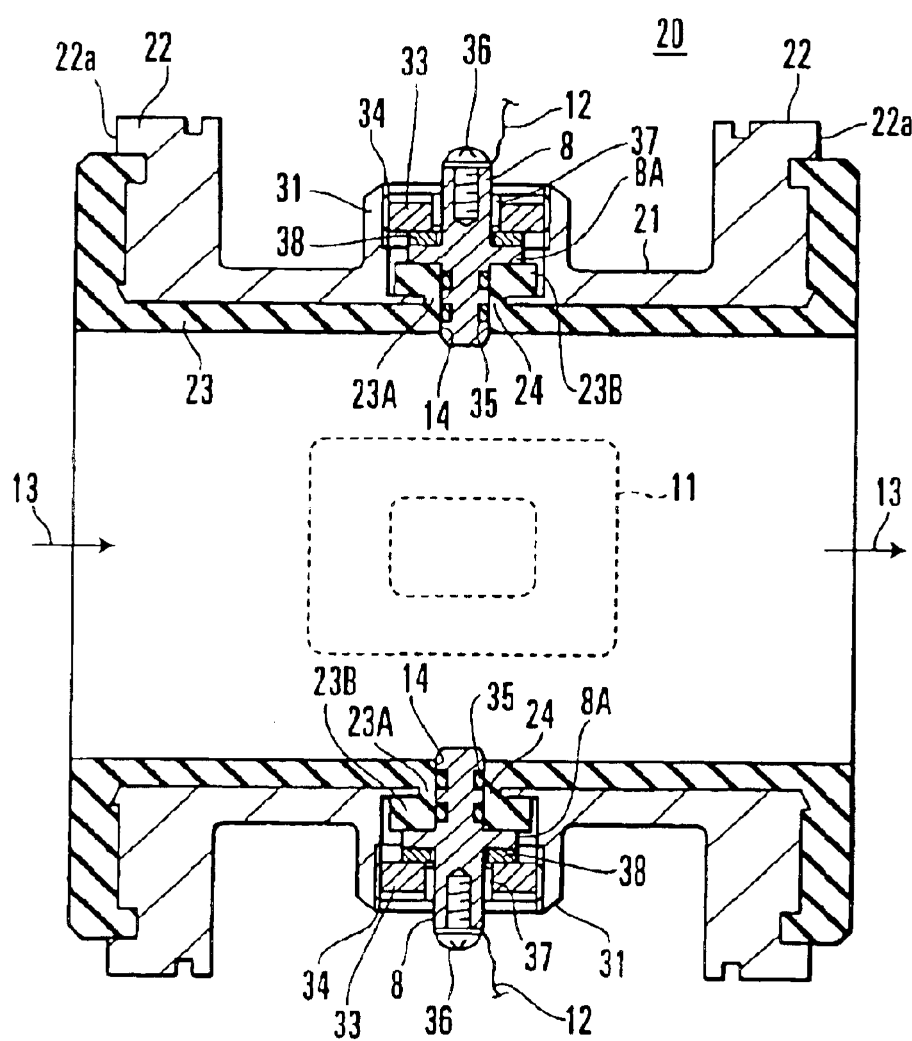
FIG. 2 is a sectional view taken along the line II—II of FIG. 1.

FIGS. 1 and 2 show a measurement pipe for an electromagnetic flowmeter according to one embodiment of the present invention. As shown in FIG. 2, a measurement pipe 20 according to this embodiment is formed of a cylindrical pipe main body 21 having openings at its two ends, and a pair of flanges 22 integrally formed on the outsides of the two ends of the pipe main body 21. The inner surface of the pipe main body 21 and pipe connection end faces 22*a* of the respective flanges 22 are covered with a lining material 23 made of a reinforcing-fiber-containing synthetic resin. The measurement pipe 20 is made of a nonmagnetic material such as stainless steel.

As shown in FIG. 1, a pair of excitation coils 11 are arranged to oppose each other at the center in the axial direction on the outer surface of the pipe main body 21, and a pair of electrodes 8 are arranged to oppose each other at positions phase-shifted from the excitation coils 11 by 90° in the circumferential direction of the pipe main body 21. Hence, the electrodes 8 and excitation coils 11 are arranged alternately to be phase-shifted from the excitation coils 11 by 90° in the circumferential direction of the pipe main body 21. The axes of the electrodes 8 are perpendicular to the axial direction of the measurement pipe 20, i.e., the flowing direction of a conductive measurement target fluid 13 flowing in the measurement pipe 20. Magnetic fluxes Φ of the excitation coils 11 at the center of the measurement pipe 20 are perpendicular to the axes of the electrodes 8. As the measurement target fluid 13, water containing no foreign substance is used.

When the measurement target fluid 13 is water, glass-fiber-mixed polypropylene or polyethylene is preferably used as the reinforcing-fiber-containing synthetic resin to form the lining material 23.

Polypropylene is lightweight with a specific gravity of 0.91 to 0.92, requires a low cost, and has a comparatively good heat resistance, weathering resistance, and corrosion resistance. The strength of polypropylene does not decrease even in water. Thus, polypropylene satisfies the specification standard for applications for measuring water such as tap water, sewage, industrial water, agricultural water, well water, cooling water, hot water, or the like. Polypropylene is also resistant to strong acid or strong alkali, is not dissolved by an ordinary solvent, and has a mechanical strength better than that of polyethylene and good electrical insulation.

The main characteristics of polypropylene are as follows:

hardness (Rockwell hardness): R90 tensile strength: 280 $kgf/cm^2$ to 380 $kgf/cm^2$ thermal deformation temperature: 110° C.

coefficient of thermal expansion: 0.00008 cm/° C.

thermal deformation temperature: 120° C.

dielectric constant ($10^3$ Hz): 2.3 others: weak-alkali resistance, weak-acid resistance, organic solvent resistance Polyethylene is polyolefin-based plastic of the same type as polypropylene. Both polyethylene and polypropylene have good flowability and thermal stability during molding, are balanced well as synthetic resins used as lining materials, and have good characteristic features particularly in rigidity and thermal deformation resistance. Polyethylene and polypropylene are both resistant to water, acid, alkali, and an organic solvent, and have good electrical insulation and low-temperature resistance.

Figure 3:
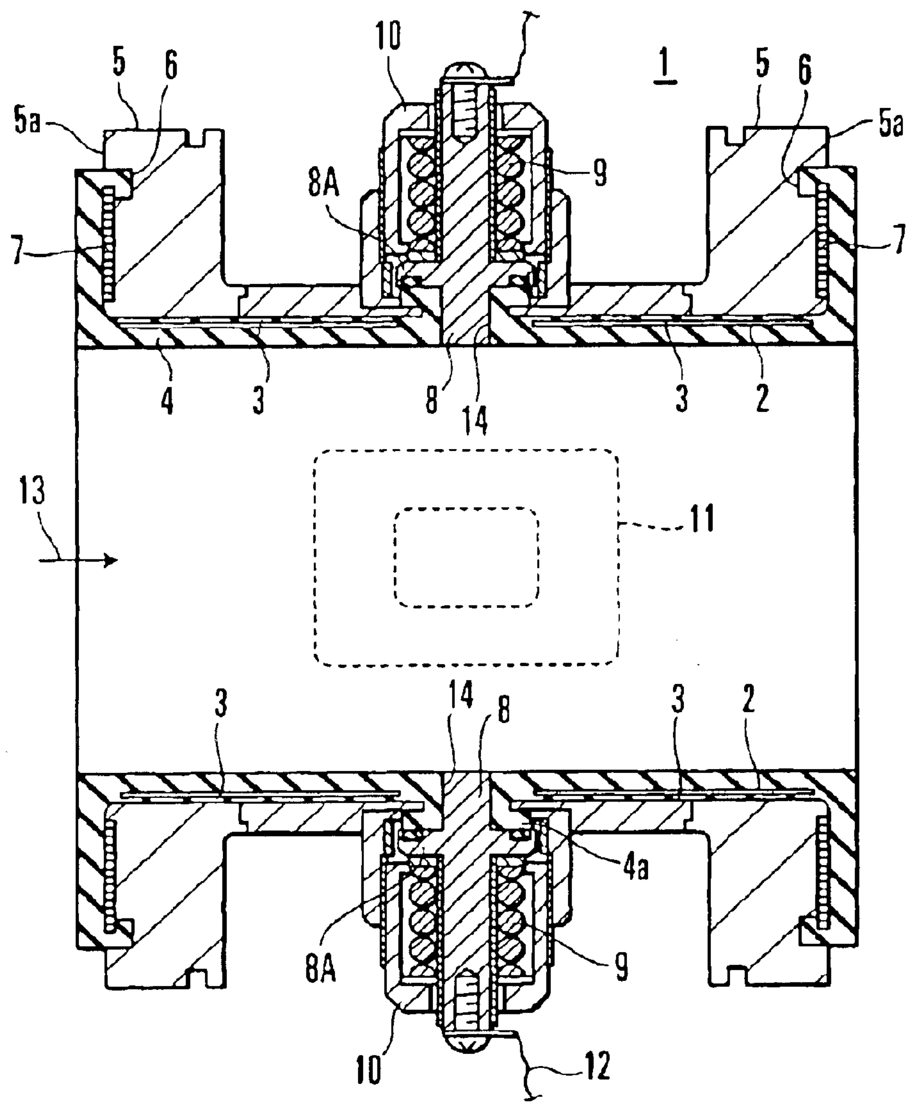
FIG. 3 is a sectional view of a conventional measurement pipe for an electromagnetic flowmeter.

The lining material 23 described above is less expensive than an insulating material such as resin tetrafluoride, chloroprene rubber, or urethane which is used as the conventional lining material. Glass-fiber-mixed polypropylene or polyethylene has a large mechanical strength and adheres to the measurement pipe 20 well. Thus, even when glass-fiber-mixed polypropylene or polyethylene is injection-molded to the inner surface of the pipe main body 21 and the pipe connection end faces 22*a* of the flanges 22 without using any reinforcing pipe 2 or ring plate 7 (FIG. 3), it will not be separated from them.

Concerning injection molding of the lining material 23, two starting holes 24 extending through the side wall of the pipe main body 21 at the center in the axial direction are formed in advance. Subsequently, a molten lining material is injected into the pipe main body 21, so that the inner surface of the pipe main body 21 and the pipe connection end faces 22*a* of the flanges 22 are covered with the lining material 23. The inner surfaces of the starting holes 24 and regions around the outer openings of the starting holes 24 are also covered with lining materials 23A and 23B.

When the lining material 23 is to be injection-molded, it is molded with a lowest stress possible so that cracking or fracture is not caused by a residual stress. The thickness of the lining material 23 is about 3 mm. The cylindrical holes of the lining material 23A formed in the inner surfaces of the starting holes 24 form electrode attaching holes 14 where the electrodes 8 are to be attached from outside the measurement pipe 20.

Cylindrical electrode attaching portions 31 for surrounding the respective electrode attaching holes 14 are integrally formed on the outer surface of the pipe main body 21 to project from it. The electrode attaching portions 31 accommodate the electrodes 8, and female threads 34 to threadably engage with caps 33 are formed in the inner surfaces of the electrode attaching portions 31.

Each electrode 8 integrally has a collar 8A at its intermediate portion in the longitudinal direction, and is fabricated from stainless steel into a rod. The electrodes 8 are inserted in the electrode attaching holes 14 through seal members 35, respectively, and their distal ends slightly project into the pipe main body 21 through the lining material 23. When the distal ends of the electrodes 8 project into the measurement pipe 20 in this manner, the measurement target fluid 13 washes off the foreign substances attaching to the electrodes 8, so that the output stability can be increased. When the measurement target fluid 13 is water, no foreign substances attach to the electrodes 8, or collision of a foreign substance against the electrodes 8 does not occur to cause noise. The proximal end of each electrode 8 projects outside the corresponding electrode attaching portion 31, and one end of a signal lead wire 12 is connected to it with a set screw 36.

Each cap 33 has a center hole 37, through which the electrode 8 is to extend, at its center, and is formed of an insulating material into a circular plate. A male thread to threadably engage with the female thread 34 of the electrode attaching portion 31 is formed in the outer surface of the cap 33. The cap urges the collar 8A of the electrode 8 through an insulating ring 38, to bring it into press contact with the annular lining portion 23B covering the peripheral portion of the outer opening of the electrode attaching hole 14, so that the electrode attaching hole 14 is sealed. A minus groove (not shown) for rotating operation is formed in the outer surface of the cap 33 in the radial direction.

The excitation coils 11 are wound around cores 41 projecting from plate cores 40, respectively. The plate cores 40 and cores 41 are made of materials having large magnetic permeabilities, e.g., a silicon steel plate, pure iron, or the like. The plate cores 40 have arcuately curved shapes to come into tight contact with the outer surface of the pipe main body 21. A cylindrical outer core 42 formed of a yoke or the like and surrounding the entire outer surface of the measurement pipe 20 is fixed to the distal end faces of the cores 41 with set screws 43. The cores 40, 41, and 42 form the magnetic circuits of the excitation coils 11.

In the electromagnetic flowmeter having the measurement pipe 20 with this structure, first, the excitation coils 11 are excited to generate a magnetic field B in a direction perpendicular to the axial directions of the electrodes 8 and the flowing direction of the measurement target fluid 13 in the measurement pipe 20. Thus, an electromotive force proportional to the average flow velocity of the measurement target fluid 13 is generated in the measurement target fluid 13 in a direction perpendicular to both the direction of the magnetic field B and the flowing direction. This electromotive force is extracted by the pair of electrodes 8, is amplified, and is recorded and transferred to an indicator, thus measuring the flow rate and average flow velocity of the measurement target fluid 13.

According to this embodiment, as the lining material 23, one obtained by mixing glass fiber as the reinforcing material in a synthetic resin such as polypropylene or polyethylene, which is inexpensive and easily accessible, is used. Thus, the lining material 23 has a sufficiently high mechanical strength. As the lining material 23 adheres to the measurement pipe 20 well, no reinforcing pipe, ring plate, or adhesive need be used to prevent peeling of the lining material 23. This facilitates fabrication of the measurement pipe 20, and can reduce the number of components. Polypropylene or polyethylene is less expensive than a fluoroplastic, so that the manufacturing cost of the measurement pipe 20 can be further reduced.

The measurement pipe according to the present invention can be suitably used not only for flow rate monitoring used at a waterwork where the measurement target fluid 13 is tap water or drainage containing a small amount of corrosive component or slurry component, but also for flow rate monitoring of cooling water of a machine or unit. Also, as flow rate monitoring at a waterwork of tap water, sewage, or the like does not require fastness properties or explosion proof properties unlike use in a plant, the total cost of the entire apparatus can be reduced.

As the lining material 23 containing glass fiber is less influenced by creep deformation, it can reliably seal the electrode attaching holes 14 by only urging it with the caps 33 and without applying any spring load need to the electrodes 8. Hence, no compression coil springs 9 (FIG. 3) are needed, further reducing the number of components. As the compression deformation of the lining material 23 is small, the electrode-to-electrode distance does not decrease, so that a stable output can be obtained.

As has been described above, according to the present invention, as the synthetic resin to be used as the lining material, an inexpensive synthetic resin which is used generally widely, e.g., polypropylene or polyethylene, can be used. Thus, the present invention requires a low cost and has a comparatively good heat resistance, weathering resistance, and corrosion resistance, so that it can be suitably used in measuring water such as tap water, sewage, industrial water, agricultural water, well water, cooling water, or hot water. Also, each of polypropylene and polyethylene has a large mechanical strength, changes over time only a little, and has good flowability and thermal stability during molding.

The glass fiber is lightweight and has a good heat resistance and chemical stability, so that it increases the mechanical strength of the lining material. Thus, a reduction in inner diameter caused by a change over time of the lining material is small. Also, the lining material adheres to the measurement pipe well, making the reinforcing pipe or ring plate unnecessary. When the glass fiber is mixed, influence by creep deformation becomes small, and no spring load need be constantly applied to the electrodes.

As the mechanical strength of the lining material is large, creeping does not occur due to a change over time, or compression deformation occurs only a little. The electrode attaching holes can accordingly be sealed reliably by only urging the electrodes against them with the caps and without applying a spring load. As the compression deformation of the lining material is small, the electrode-to-electrode distance does not decrease, and a change in output can be prevented.

What is claimed is:

1. A measurement pipe for an electromagnetic flowmeter, comprising:

- a cylindrical pipe main body having openings at two ends thereof;
- a pair of flanges integrally formed with said pipe main body to project outside the openings;
- a lining material made of a reinforcing-material-mixed synthetic resin to cover at least an inner surface of said pipe main body and the side surfaces of the flanges;
- an attaching hole extending through a side wall of the pipe main body;
- a rod-like electrode inserted from outside the pipe main body in the attaching hole and having a distal end opposing an interior of said pipe main body, said electrode having a collar at a center thereof in a longitudinal direction;
- a cylindrical electrode attaching portion projecting from an outer surface of said pipe main body to surround the attaching hole; and
- a cap threadably engaging with said electrode attaching portion to urge said collar of said electrode against said lining material covering the peripheral region of the outer opening of the electrode attaching hole.

2. A measurement pipe for an electromagnetic flowmeter, comprising:

- a cylindrical pipe main body having openings at two ends thereof;
- a pair of flanges integrally formed with said pipe main body to project outside the openings; and
- a lining material made of either one of glass-fiber-mixed polypropylene and polyethylene to cover at least an inner surface of said pipe main body and the side surfaces of said flanges.

3. A measurement pipe according to claim 1, wherein said lining material has a covering thickness of about 3 mm.

4. A measurement pipe according to claim 2, wherein said lining material has a covering thickness of about 3 mm.

* * * * *